(12) United States Patent
Suzuki

(10) Patent No.: US 12,135,007 B2
(45) Date of Patent: Nov. 5, 2024

(54) HORIZONTAL SHAFT ROTOR

(71) Applicant: GLOBAL ENERGY CO., LTD., Shizuoka (JP)

(72) Inventor: Masahiko Suzuki, Shizuoka (JP)

(73) Assignee: GLOBAL ENERGY CO., LTD., Shizuoka (JP)

( * ) Notice: Subject to any disclaimer, the term of this patent is extended or adjusted under 35 U.S.C. 154(b) by 609 days.

(21) Appl. No.: 16/972,815

(22) PCT Filed: May 30, 2019

(86) PCT No.: PCT/JP2019/021479
§ 371 (c)(1),
(2) Date: Dec. 7, 2020

(87) PCT Pub. No.: WO2019/235344
PCT Pub. Date: Dec. 12, 2019

(65) Prior Publication Data
US 2021/0246867 A1  Aug. 12, 2021

(30) Foreign Application Priority Data

Jun. 8, 2018 (JP) .................................. 2018-110438

(51) Int. Cl.
*F03D 1/06* (2006.01)
*F03B 3/12* (2006.01)

(52) U.S. Cl.
CPC ............ *F03D 1/0625* (2013.01); *F03B 3/121* (2013.01); *F03D 1/0633* (2013.01); *F05B 2240/221* (2013.01); *F05B 2240/30* (2013.01)

(58) Field of Classification Search
CPC ........ F03D 1/06; F03D 1/0608; F03D 1/0625; F03D 1/0633; F03D 1/0641;
(Continued)

(56) References Cited

U.S. PATENT DOCUMENTS 3,171,495 A * 3/1965 Puckett .................... B64C 11/16
416/228
4,180,372 A * 12/1979 Lippert, Jr. ........... F03D 7/0252
416/41
(Continued)

FOREIGN PATENT DOCUMENTS

CN   101387262 A   3/2009
CN   107735571 A   2/2018
(Continued)

OTHER PUBLICATIONS

Australian Exam Report Corresponding to 2019282972 mailed Nov. 24, 2021.
(Continued)

*Primary Examiner* — John M Zaleskas
(74) *Attorney, Agent, or Firm* — Finch & Maloney PLLC

(57) ABSTRACT

An object of the present invention is to provide a horizontal shaft rotor suitable for a wind turbine or a water turbine, which has blades with high wind receiving efficiency, resistance to breakage, and high rotation efficiency.

A horizontal shaft rotor 1, wherein the horizontal shaft rotor 1 has a plurality of blades 3 facing a radial direction fixed to the peripheral surface of the hub 2, and each blade 3 is a lift type in which a string length is gradually increased from a base end part 4A to a blade end 3G in a front view, and a distal part from a radial direction middle part 3A of the blade 3 is a forward curved part 5, and a front end surface 5A of a forward tip of the forward curved part is a lift type that a leading edge 5F is thicker in a front view.

8 Claims, 5 Drawing Sheets

(58) Field of Classification Search
CPC .. F03D 1/0675; F03D 1/0683; F05B 2210/16; F05B 2240/30; F05B 2240/301; F05B 2240/307; F05B 2240/21–232; Y02E 10/72–74

See application file for complete search history.

(56) References Cited

U.S. PATENT DOCUMENTS

| | | | |
|---|---|---|---|
| D438,609 S * | 3/2001 | Colliver | F03D 9/25 D23/411 |
| 6,328,533 B1 | 12/2001 | Decker et al. | |
| 8,100,661 B2 | 1/2012 | Enevoldsen et al. | |
| 10,690,112 B2 | 6/2020 | Keeley | |
| 11,162,472 B2 | 11/2021 | Suzuki | |
| 2003/0095864 A1 * | 5/2003 | Ivanovic | F04D 29/384 416/189 |
| 2006/0210397 A1 * | 9/2006 | Eimer | F04D 29/164 415/220 |
| 2006/0216153 A1 * | 9/2006 | Wobben | F03D 1/0633 416/241 A |
| 2007/0248466 A1 * | 10/2007 | Lotrionte | F03B 3/04 416/223 R |
| 2008/0093860 A1 * | 4/2008 | Suzuki | F03D 1/0608 416/223 R |
| 2008/0145224 A1 * | 6/2008 | Mitchell | F03D 7/06 416/240 |
| 2009/0068019 A1 * | 3/2009 | Wobben | F03D 1/0675 416/223 R |
| 2009/0257885 A1 * | 10/2009 | Godsk | F03D 1/06 416/244 R |
| 2011/0052400 A1 | 3/2011 | Khan | |
| 2011/0158816 A1 * | 6/2011 | Wobben | F03D 1/0633 416/223 R |
| 2012/0027595 A1 * | 2/2012 | Pesetsky | F03D 1/0633 416/147 |
| 2012/0087791 A1 * | 4/2012 | Waarseth-Junge | F03D 1/0608 415/220 |
| 2013/0183160 A1 * | 7/2013 | Agtuca | F01D 5/147 416/228 |
| 2013/0309095 A1 * | 11/2013 | Brock | F03D 1/0633 416/226 |
| 2015/0110617 A1 * | 4/2015 | Stein | F01D 5/141 416/223 R |
| 2015/0132141 A1 | 5/2015 | Stege et al. | |
| 2015/0285217 A1 | 10/2015 | Liu et al. | |
| 2016/0131107 A1 * | 5/2016 | Agtuca | F03D 17/00 416/147 |
| 2017/0130695 A1 * | 5/2017 | Agtuca | G09F 19/02 |
| 2017/0370345 A1 * | 12/2017 | Keeley | F03B 17/061 |
| 2019/0009873 A1 * | 1/2019 | Suzuki | B63H 1/26 |
| 2019/0055918 A1 * | 2/2019 | Suzuki | F03D 1/06 |
| 2019/0055927 A1 * | 2/2019 | Suzuki | F03D 9/25 |
| 2020/0010173 A1 * | 1/2020 | Scully | B64C 23/069 |
| 2021/0246869 A1 * | 8/2021 | Suzuki | F03D 3/005 |

FOREIGN PATENT DOCUMENTS

| | | | |
|---|---|---|---|
| CN | 107850036 A | 3/2018 | |
| DE | 4030559 A1 | 4/1992 | |
| EP | 0 801 230 A2 | 10/1997 | |
| EP | 2 075 408 A3 | 3/2013 | |
| EP | 2 990 643 A1 | 3/2016 | |
| FR | 2942508 A1 * | 8/2010 | F03D 1/06 |
| JP | 2006152957 A * | 6/2006 | B63H 1/26 |
| JP | 2006-257886 A | 9/2006 | |
| JP | 2008196425 A * | 8/2008 | |
| JP | 2010159657 A * | 7/2010 | B63H 1/26 |
| JP | 2010261350 A * | 11/2010 | F03B 3/04 |
| JP | 2012132335 A * | 7/2012 | |
| JP | 2012224140 A * | 11/2012 | |
| JP | 2013-189970 A | 9/2013 | |
| JP | 2016176413 A * | 10/2016 | F03B 3/04 |
| JP | 2017020372 A * | 1/2017 | F03B 3/04 |
| JP | 2017-150375 A | 8/2017 | |
| JP | 2017154576 A * | 9/2017 | B63H 1/26 |
| JP | 2018040301 A * | 3/2018 | F03B 11/02 |
| JP | 2018040304 A * | 3/2018 | F03D 1/06 |
| JP | 2018040306 A * | 3/2018 | |
| JP | 2018150923 A * | 9/2018 | B63H 1/26 |
| WO | WO-2016152639 A1 * | 9/2016 | F03B 3/04 |
| WO | 2017145488 A1 | 8/2017 | |
| WO | WO-2019049901 A1 * | 3/2019 | F03B 11/02 |
| WO | WO-2019049902 A1 * | 3/2019 | B63H 1/26 |
| WO | WO-2019054307 A1 * | 3/2019 | B63H 1/26 |
| WO | WO-2019189107 A1 * | 10/2019 | |

OTHER PUBLICATIONS

Extended European Search Report corresponding to European application 19814231.7 mailed Feb. 15, 2022.

International Search Report Corresponding to PCT/JP2019/021479 mailed Sep. 3, 2019.

Written Opinion Corresponding to PCT/JP2019/021479 mailed Sep. 3, 2019.

Chinese Office Action Corresponding to 201980039074.7 issued Jan. 26, 2024.

* cited by examiner

Sectional View Along Line III-III

Sectional View Along Line IV-IV

Sectional View Along Line V-V

Sectional View Along Line VI-VI

Sectional View Along Line VII-VII

Sectional View Along Line VIII-VIII

HORIZONTAL SHAFT ROTOR

TECHNICAL FIELD

The present invention relates to a horizontal shaft rotor that a risk of breaking of wind turbine blades is small even if strong centrifugal force acts through generating a large lift, moreover efficient rotation is possible even at a low wind speed.

BACKGROUND OF THE INVENTION

The propeller type horizontal shaft wind turbine is disclosed in, for example, Patent Literature 1. In this wind turbine, a horizontal rotor shaft is projected from a nacelle that is pivotably supported by a support column, and a plurality of blades are fixed toward a radial direction to a rotor fixed to a tip of the horizontal rotor shaft.

PRIOR ART

Patent Literatures

Patent Literature 1: JP2013-189970A

SUMMARY OF THE INVENTION

Problems to be Solved by the Invention

In the invention disclosed in Patent Literature 1, blades are a same thickness over the whole, and a string length is the same from a tip to a base end, in addition the tip is simply bent forward. This wind turbine rotates preferably as a pinwheel, but a cogging torque of magnet acts on a generator when the wind turbine is connected to the generator, so that rotational force drops extremely, this wind turbine is inferior in practicality for a generator.

In particular, the blade is a flat plate shape, so that it is difficult to fully exert the Coanda effect. Especially in a large wind turbine, if the power generation efficiency is not excellent, only the cost burden will be large and a practicality becomes poor.

Blades of a large wind turbine are easily destroyed by rotational centrifugal force and wind pressure, and if a rigidity is increased, blades become heavy and a rotational efficiency deteriorates, and at low wind speeds, it is difficult to start and a practicality becomes poor.

In view of such circumstances, it is an object of the present invention to provide a blade having excellent wind receiving performance, being hard to be broken, and having high rotational efficiency, and to provide a horizontal shaft rotor suitable for a wind turbine and a water turbine equipped with this blade.

Means for Solving the Problems

The present invention has taken the following technical measures in order to solve the above problems.

(1) A horizontal shaft rotor comprising a hub and a plurality of blades facing a radial direction and fixed to a peripheral surface of the hub, wherein each of the blades is a lift type of which a string length is gradually increased from a base end part to a blade end in a front view, wherein a distal part from a radial direction middle part of the blade is a forward curved part, and wherein a front end surface of a forward tip of the forward curved part is a lift type in which a leading edge is thicker in a front view.

(2) The horizontal shaft rotor according to (1) above, wherein the front end surface of the forward tip of the forward curved part is the lift type with a thick leading edge in a front view, and the leading edge and a trailing edge of the front end surface are located on the same rotating track.

(3) The horizontal shaft rotor according to (1) or (2) above, wherein a radius of curvature of the forward curved part is larger on a curved inner surface than on a curved outer surface, in a side view of the blade of the horizontal shaft rotor.

(4) The horizontal shaft rotor according to any one of (1) to (3) above, wherein a thickness of a portion parallel to an axis center line at a base end of the front end surface of the forward tip is a maximum thickness portion of the blade, in a side view of the forward curved part.

(5) The horizontal shaft rotor according to any one of (1) to (4) above, wherein the front end surface at the forward tip of the forward curved part is orthogonal to the axis center line in a side view, and the trailing edge is more inclined than the leading edge toward a rear surface direction with respect to a rotation direction in planar view.

(6) The horizontal shaft rotor according to any one of (1) to (5) above, wherein a maximum thickness of the front end surface at the forward tip of the forward curved part is set to be approximately 50% of the thickness of the base end part of a base part, and a front part of the front end surface is a thicker lift type.

(7) The horizontal shaft rotor according to any one of (1) to (6) above, wherein a rear surface of the base part of the blade is orthogonal to the axis center line in a side view, and the front surface of the base part is gradually inclined toward the rear surface direction from the base end part to the radial direction middle part of the blade.

Advantages of the Invention

According to the present invention, the following effects can be achieved.

In the invention described in (1) above,
each of the blades is a lift type of which a string length is gradually increased from the base end part to the blade end in a front view, and the distal part from the radial direction middle part of the blade is the forward curved part, so that, when the blade receives an airflow from the front, a fluid that hits the forward curved part with a long string length is collected at high speed on an curved inner surface of the forward curved part from a blade tip direction toward the radial direction middle part of the blade, and passes diagonally backward from a trailing edge of the radial direction middle part, and as a reaction, the blade is rotated toward a rotation direction.

In the invention described in (2) above, the front end surface of the forward tip of the forward curved part is the lift type with a thick leading edge in a front view, and the leading edge and a trailing edge of the front end surface are located on the same rotating track, so that a fluid passing along a peripheral surface of the blade in accordance with rotations of the blade becomes high speed due to the Coanda effect and passes backward on the rotating track, and the blade moves forward on the rotating track as a reaction. In particular, a portion near the front end surface of the forward tip is a maximum thickness, so that a high-speed flow passes through the blade, and the blade rotates at high speed due to the Coanda effect as a reaction.

In the invention described in (3) above, the radius of curvature of the forward curved part is larger on the curved inner surface than on the curved outer surface, in a side view of the blade of the horizontal shaft rotor, so that a thickness of a cross section can be increased when the blade end is facing upward, a negative pressure is generated due to increasing of flow velocity due to the Coanda effect at that part in accordance with rotations, a surrounding atmospheric pressure instantly rushes to a portion of the negative pressure, and the blade moves toward a rotation direction due to a difference in air pressure.

In the invention described in (4) above, the thickness of the portion parallel to the axis center line at the base end of the front end surface of the forward tip is the maximum thickness of the blade, in a side view of the forward curved part, so that an airflow passing through the surface becomes a high-speed flow due to the Coanda effect, a fluid pressure of the high-speed flow decreases, a fluid hitting the curved inner surface moves toward the blade end, and a rotational efficiency is improved by a passage of a large amount of fluid.

In the invention described in (5) above, the front end surface at the forward tip of the forward curved part is orthogonal to the axis center line in a side view, and the trailing edge is more inclined than the leading edge toward a rear surface direction with respect to a rotation direction in planar view, so that a fluid along the front end surface of the forward tip passes toward a trailing edge direction in accordance with rotations of the blade, as a reaction, the blade moves toward a rotation direction.

In the invention described in (6) above, the maximum thickness of the front end surface at the forward tip of the forward curved part is set to be approximately 50% of the thickness of the base end part of a base part, and a front part of the front end surface is a thicker lift type, so that a high-speed flow is generated due to the Coanda effect even at the blade end, and the rotational efficiency is improved.

In the invention described in (7) above, a rear surface of the base part of the blade is orthogonal to the axis center line in a side view, and a front surface of the base part is gradually inclined toward the rear surface direction from the base end part to the radial direction middle part of the blade, so that the fluid that hits the front surface of the base part of the blade moves toward the curved inner surface of the forward curved part in accordance with rotations of the blade, a large amount of fluid passes from the trailing edge toward the outward direction while pushing the curved inner surface in the rotation direction, a high-speed flow is generated due to the Coanda effect, and the blade is rotated at high speed, as a reaction.

EMBODIMENTS OF THE INVENTION

An embodiment according to the present invention will be described with reference to the drawings. Although a horizontal shaft rotor 1 of the embodiment will be described for a wind turbine, the present invention can also be applied for a water turbine.

Figure 1:
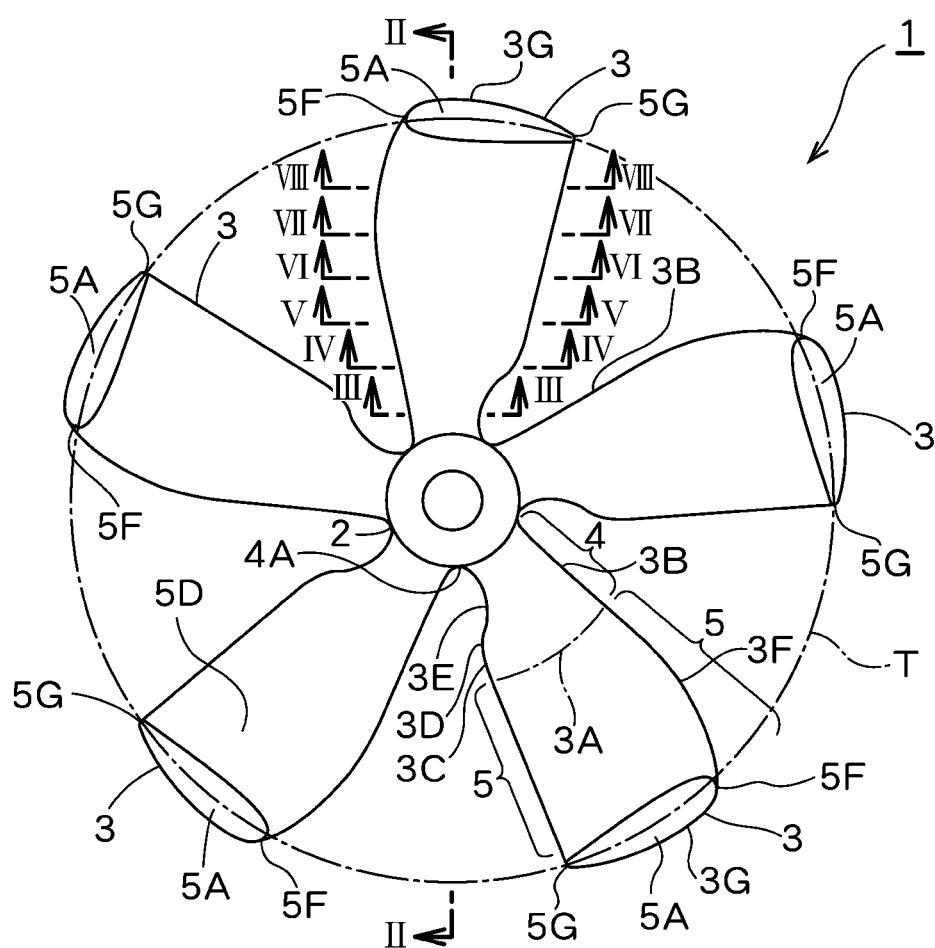
FIG. 1 is a front view of the horizontal shaft rotor according to the present invention.

In FIG. 1 being a front view, in the horizontal shaft rotor 1 according to the present invention, a plurality of lift type blades 3 (five blades in FIG. 1) are fixed to a peripheral surface of a hub 2 at equal intervals toward a radial direction. The horizontal shaft rotor 1 is a medium-sized rotor, for example, having that this diameter is 430 cm, a maximum string length of the blade 3 is 100 cm and a string length of a base end part 4A is about 39 cm. The horizontal shaft rotor 1 rotates counterclockwise when it receives wind from the front. Note that these dimensions are merely examples.

Figure 2:
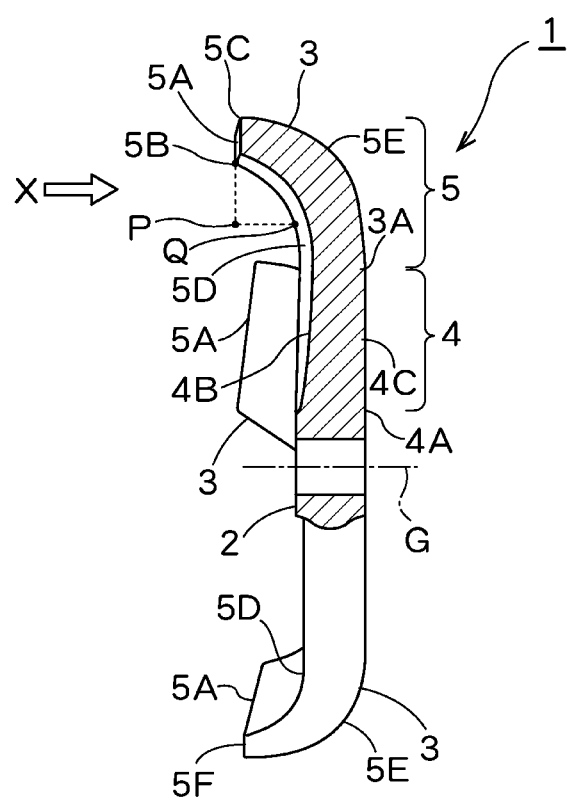
FIG. 2 is a vertical cross-sectional view taken along the line II-II in FIG. 1.

FIG. 2 is a vertical cross-sectional view taken along the line II-II in FIG. 1. A forward curved part 5 that is largely curved toward the front surface direction is formed at a tip of a base part 4 in contact with a hub 2 with a radial direction middle part 3A of the blade 3 as a boundary. In a front shape of the blade 3, the string length is gradually increased from a base end part 4A to a blade end, and a wind receiving area at a centrifugal portion during rotation is increased.

A thickness of the base end part 4A is, for example, 20%±2% of a radius of rotation, and, up to the radial direction middle part 3A in the radial direction, a rear surface 4C is orthogonal to an axis center line G of the hub 2.

A front surface 4B is gradually inclined backward from the base end part 4A to the radial direction middle part 3A, and a thickness of the radial direction middle part 3A is slightly thinner than a thickness of the base end part 4A.

In the forward curved part 5, a front end surface 5A at a forward tip in a side view is orthogonal to the axis center line G. A front surface from a base end 5B of the front end surface 5A to the radial direction middle part 3A is a curved inner surface 5D. A rear surface from a tip 5C of the front end surface 5A of the forward tip is a curved outer surface 5E up to the radial direction middle part 3A.

A radius of curvature of the curved inner surface 5D is larger than a radius of curvature of the curved outer surface 5E, and a thickness is decreased from the radial direction middle part 3A to the tip 5C. However, as shown in the cross sections in FIGS. 5 to 8, the forward curved part 5 is gradually thickened from the radial direction middle part 3A in FIG. 2 toward the blade end direction.

The Coanda effect that occurs on the surface of the blade 3 during rotation becomes greater as the blade 3 becomes thicker, and the flow velocity becomes faster. In the vicinity of the cross section of the line VIII-VIII of FIG. 1 in the forward curved part 5, the thickness is large and the string length is long, so that the speed becomes the highest in this portion and the efficiency of the blade 3 during high speed rotation is improved.

Figure 8:
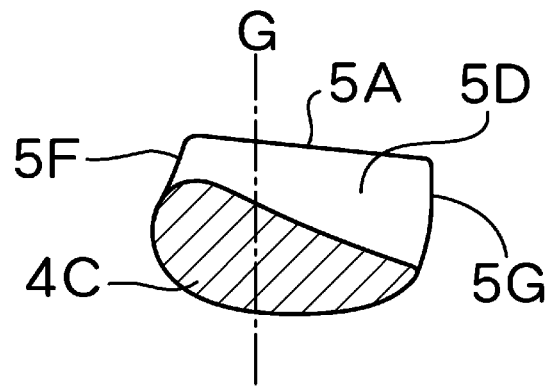
FIG. 8 is a cross-sectional plan view taken along the line VIII-VIII in FIG. 1.

As shown in FIGS. 2 and 8, the forward curved part 5 is thick, so that the Coanda effect is large and a high-speed flow is generated, and even if the wind speed is decreased, the rotation of the horizontal shaft rotor 1 is maintained by the continuation of the Coanda effect in accordance with the rotation.

Figure 3:
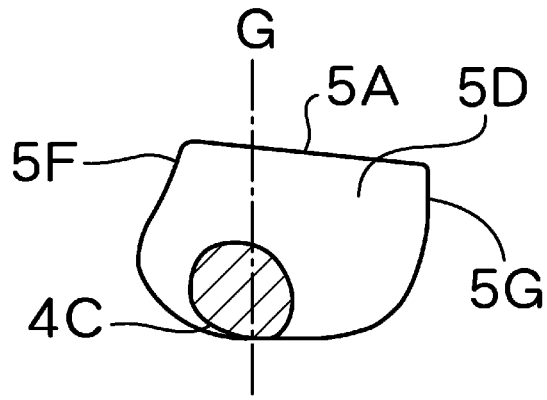
FIG. 3 is a cross-sectional plan view taken along the line III-III in FIG. 1.

In FIG. 1, the string length of the blade 3 is, for example, 50%±5% of the radius of rotation at a blade end part, and this value is preferable as the result of stacking experiments. This value is gradually reduced toward the direction of the base end part 4A. From a cut-in point 3D at the position of the line IV-IV on a trailing edge 3C, which is 20% of the radius of rotation from the axis center line G, toward the direction of a leading edge 3B, a cut-in part 3E is formed and the string length is reduced. The string length of the cut-in part 3E is about 20%±2% of the radius of rotation. The cross section of the line III-III in FIG. 1 is a substantially circular shape at the base part 4 as shown in FIG. 3, and is a columnar shape.

The leading edge 3B of the blade 3 is a substantially straight line from the axis center line G toward the direction of the tip, that is, from a curved base point 3F, which corresponds to 80% of the radius of rotation in FIG. 1, toward the base end part 4A of the base part 4, and the leading edge 3B is a convex curved surface from the curved base point 3F to the blade end 3G, and a leading edge 5F projects forward.

In FIG. 1, the shape of the front end surface 5A at the forward tip of the forward curved part 5 is a lift type in which the thickness of the cross section of the blade 3 shown in FIGS. 5 to 8 is gradually reduced, the maximum thickness is about 50% of the base end part 4A in the base part 4, but is not limited to this. As shown in FIG. 2, the front end surface 5A of the blade 3 is orthogonal to the axis center line G.

As shown in FIG. 1, the string length of the front end surface 5A of the forward tip in the forward curved part 5 is gradually decreased from the cross section of the line VIII-VIII toward the centripetal direction, and the leading edge 5F projects forward, in addition, the curved inner surface 5D is gradually inclined toward the rear surface direction from the leading edge 5F to the trailing edge 5G.

As a result, a thickness at the base end 5B of the front end surface 5A of the forward tip in FIG. 2 is larger than a width of an oblique line portion in FIG. 8, and the rotation efficiency of the entire blade 3 is improved by the high-speed rotation generated due to the Coanda effect in accordance with the rotation in this part.

In this case, the front end surface 5A of the forward tip is orthogonal to the axis center line G, and as shown in FIG. 8, the trailing edge 5G rather than the leading edge 5F is inclined 6 to 12 degrees toward the direction of the curved outer surface 5E, so that, when receiving wind from a front direction, the blade 3 is pushed toward the leading edge 5F, and the rotation efficiency is improved.

In addition, both of the leading edge 5F and the trailing edge 5G of the front end surface 5A of the forward tip are located on the same rotating track T, so that the resistance during rotation is small.

In the cross section of the blade 3 with the blade end 3G facing upward in FIG. 1, as shown in FIGS. 3 to 8, the base part 4 is substantially circular, and the airflow receiving from the front passes through the cut-in part 3E without resistance.

Figure 4:
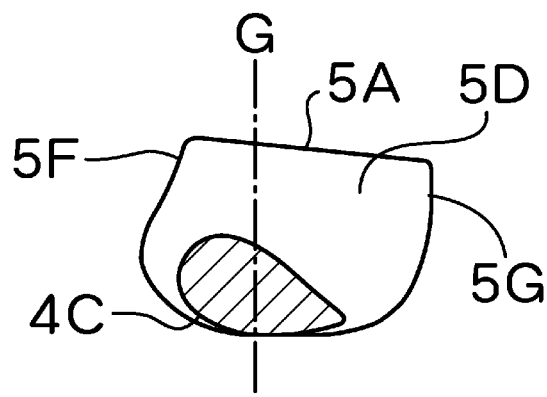
FIG. 4 is a cross-sectional plan view taken along the line IV-IV in FIG. 1.
Figure 5:
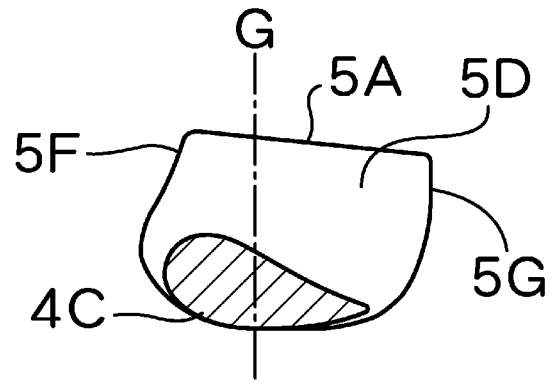
FIG. 5 is a cross-sectional plan view taken along the line V-V in FIG. 1.

In FIG. 4, from the axis center line G to the trailing edge 5G, it is inclined toward the direction of the rear surface 4C by about 37 degrees with respect to the rotation direction, and when an airflow hits from the front, the blade 3 is pushed toward the direction of the leading edge 3B to rotate. In FIG. 5, from the axis center line G to the trailing edge 5G, it is inclined toward the direction of the rear surface 4C by, for example, about 30 degrees with respect to the rotation direction, and the airflow hitting the front surface 4B of the base part 4 moves toward the direction of the trailing edge 3C of the base part 4, and the blade 3 moves strongly in the counterclockwise direction.

Figure 6:
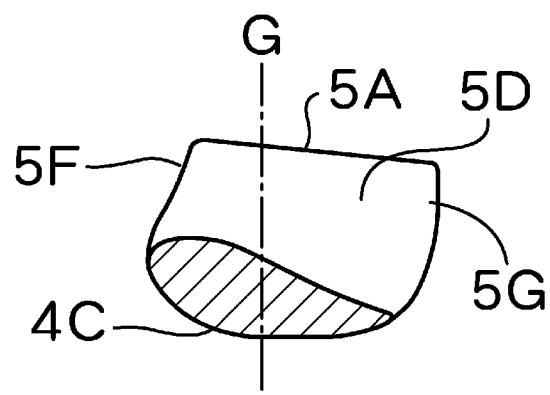
FIG. 6 is a cross-sectional plan view taken along the line VI-VI in FIG. 1.

In FIG. 6, from the axis center line G to the trailing edge 5G, it is inclined toward the direction of the rear surface 4C by, for example, about 26 degrees with respect to the rotation direction, and the airflow hitting the curved inner surface 5D of the forward curved part 5 moves toward the direction of the trailing edge 5G of the forward curved part 5, the blade 3 moves toward a rotation direction.

Figure 7:
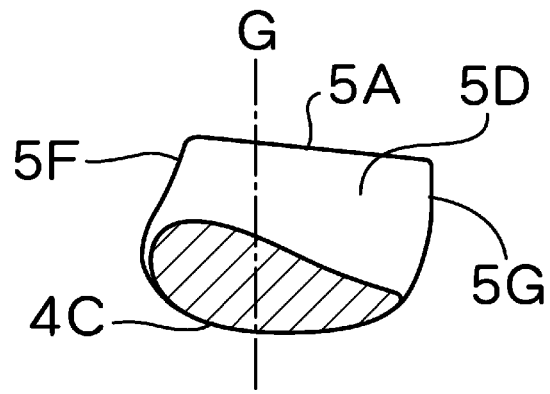
FIG. 7 is a cross-sectional plan view taken along the line VII-VII in FIG. 1.

As shown in FIG. 7, from the axis center line G to the trailing edge 5G, it is inclined toward the direction of the rear surface 4C by, for example, about 23 degrees with respect to the rotation direction, and in FIG. 8, from the axis center line G to the trailing edge 5G, it is inclined toward the direction of the rear surface 4C by about 25 degrees with respect to the rotation direction.

An airflow hitting the curved inner surface 5D is collected in the portion of the line VI-VI and in the portion from the line VIII-VIII to the line VII-VII in FIG. 1, and moves in the direction of the trailing edge 5G of the forward curved part 5, so that the blade 3 rotates vigorously toward a rotation direction due to the pressure difference.

That is, at the base part 4 of the blade 3, the airflow hitting the front surface in FIG. 1 passes from the radial direction middle part 3A toward the outside of the trailing edge 3C on the front surface 4B in the direction of the base end part 4A of the base part 4, as a reaction to the Coanda effect, the action of pulling the blade 3 toward a rotation direction is increased.

As shown in FIGS. 3 to 8, in the front end surface 5A of the forward tip, the trailing edge 5G is more inclined than the leading edge 5F toward the direction of the rear surface 4C by about 10 degrees with respect to the rotation direction orthogonal to the axis center line G.

In the forward curved part 5, in FIG. 1, the leading edge 5F and the trailing edge 5G at the front end surface 5A of the forward tip are located on the rotating track T, so that the airflow passing through this peripheral surface passes backward on the rotating track T, and, due to the reaction, the blade 3 is strongly pulled in the counterclockwise direction on the rotating track, and the rotation efficiency is improved.

In FIG. 2, a collective airflow that is collected an airflow that slides from the base end 5B of the front end surface 5A at the forward tip to the curved inner surface 5D toward the direction of the radial direction middle part 3A of the blade 3, and, an airflow that moves from the direction of the radial direction middle part 3A of the blade 3 in FIG. 1 to a portion of the line VII-VII, wherein the collective airflow passes at high speed in the outward direction of the trailing edge 5G of the blade 3 in the portion, as a reaction due to the Coanda effect, the blade 3 is rotated at high speed.

In FIG. 2, when an airflow indicated by an arrow X hits the curved inner surface 5D, a speed of an airflow sliding on the curved inner surface 5D from the point 5B to an airflow landing point Q becomes faster than a speed of an airflow from an airflow starting point P to the airflow landing point Q (the air pressure drops), so that a large amount of air is collected at the portion of the airflow landing point Q, and passes at a high speed in the outward direction of the trailing edge 5G, as a reaction, the rotation efficiency of the blade 3 is improved.

The airflow that hits the front surface 4B inclined backward from the base end part 4A of the base part 4 of the blade 3 to the radial direction middle part 3A of the blade 3 and passes through toward the blade end strongly hits the forward curved part 5, rotates the blade 3 in the rotation direction, and passes toward the outside from the trailing edge 5G.

The radial length of the forward curved part 5 is, for example, about 50% of the radius of rotation of the blade 3, and the front end surface 5A of the forward tip thereof projects forward by a length corresponding to approximately 72% of a length direction from the rear surface 4C of the base part 4.

The first feature of this unique shape has the function that an airflow received on the curved inner surface 5D is collected at the portion of the airflow landing point Q in FIG. 2 and is passed in the outward direction of the trailing edge 5G.

In addition, the portion of the leading edge 5F of the forward curved part 5 is thicker, so that a high-speed flow due to the Coanda effect is efficiently generated, and when the high-speed flow passes, the blade 3 is strongly pulled in the rotation direction due to the pressure difference as a reaction, high-speed rotational force is generated.

In this blade 3, the tip portion from the radial direction middle part 3A is the forward curved part 5 that curves forward, and the string length thereof is lengthened, so that the wind receiving area in a rotating centrifugal portion becomes large, the rotation efficiency is improved.

The airflow that hits the curved inner surface 5D from the front is become high speed at the curved inner surface 5D and is collected at the center part of the forward curved part 5, and a large amount of accelerated airflow passes toward the outside from the trailing edge 5G, so that, as a reaction, the blade 3 is rotated at high speed.

In addition, the portion of the leading edge 5F of the forward curved part 5 is thicker, so that the airflow moving along the surface of the blade 3 passes at high speed due to the Coanda effect, as a reaction, the rotation efficiency of the blade 3 is improved.

The forward curved part 5 has a long string length and projects more forward greatly than the base part 4, so that it can efficiently receive an airflow from a diagonal direction, and even if an airflow direction is changed, the blade 3 can continue to rotate without reducing the rotation speed.

Furthermore, in the thicker forward curved portion 5, the flow velocity of the airflow passing through the surface is increased, so that the pressure at the front part is decreased, a flow at the rear part is returned to the original, and a pressure is increased. Therefore, the rotational force does not drop sharply, the rotation is continued, and a high rotational torque is maintained.

The horizontal shaft rotor 1 of the present invention can be applied from a small size having a diameter of about 5 cm to a large size having a diameter of 10 m or more, and is suitable for a wind turbine and a water turbine.

INDUSTRIAL APPLICABILITY

The forward curved part that curves forward from the center of the blade length does not cause a blade end stall, so that the rotation efficiency is improved. In addition, the horizontal axis rotor 1 of the present invention has a thicker forward curved part, so that it has a high rotation efficiency due to the Coanda effect and has high rigidity, and is used in a wind power generator and a hydraulic power generator.

REFERENCE SIGNS LIST 1. horizontal shaft rotor
2. hub
3. blade
3A. radial direction middle part
3B. leading edge
3C. trailing edge
3D. cut-in point
3E. cut-in part
3F. curved base point
3G. blade end
4. base part
4A. base end part
4B. front surface
4C. rear surface
5. forward curved part
5A. front end surface
5B. base end
5C. tip
5D. curved inner surface
5E. curved outer surface
5F leading edge
5G. trailing edge
E. center line
G. axis center line
P. airflow start point
Q. airflow landing point

What is claimed is:

1. A horizontal shaft rotor comprising:
a hub and a plurality of blades facing in a radial direction and fixed to a peripheral surface of the hub,
wherein a distal part from a radial direction middle part of each of the plurality of blades has a forward curved part,
a front end surface of a forward tip of the forward curved part is a lift type in which a leading edge side of the front end surface is thicker than a trailing edge side of the front end surface, in a front view,
at least a line extending along the front end surface, located at the forward tip of the forward curved part remote from the hub, is orthogonal to an axis center line of the hub, and
a maximum thickness of the front end surface at the forward tip of the forward curved part is set to be 50% of a thickness of a base end part of a base part.

2. The horizontal shaft rotor according to claim 1, wherein a leading edge and a trailing edge of the front end surface are located on a same rotating track.

3. The horizontal shaft rotor according to claim 1, wherein a radius of curvature of the forward curved part is larger on a curved inner surface than on a curved outer surface, in a side view of each of the plurality of blades of the horizontal shaft rotor.

4. The horizontal shaft rotor according to claim 1, wherein a thickness of a portion parallel to the axis center line, at a base end of the front end surface of the forward tip, is a maximum thickness portion of each of the plurality of blades, in a side view of the forward curved part.

5. The horizontal shaft rotor according to claim 1, wherein a trailing edge is more inclined than a leading edge toward a rear surface direction with respect to a rotation direction in planar view.

6. The horizontal shaft rotor according to claim 1, wherein a rear surface of a base part of each of the plurality of blades is orthogonal to the axis center line in a side view, and a front surface of the base part gradually inclines toward a rear surface direction from a base end part to the radial direction middle part of each of the plurality of blades.

7. A horizontal shaft rotor comprising:
a hub having a plurality of blades extending radially therefrom, and each of the plurality of blades being fixed to a peripheral surface of the hub, and
the hub defining an axis center line,
wherein a distal part of each of the plurality of blades has a forward curved part,
a front end surface of a forward tip, of the forward curved part, has a lift type design in which a leading edge side of the front end surface is thicker than a trailing edge side of the front end surface,
at least a line, extending along the front end surface of each of the plurality of blades, extends orthogonal to the axis center line of the hub, and
a maximum thickness of the front end surface at the forward tip of the forward curved part is set to be 50% of a thickness of a base end part of a base part.

8. A horizontal shaft rotor comprising:
a hub having a plurality of blades extending radially therefrom, and each of the plurality of blades being fixed to a peripheral surface of the hub, and
the hub defining an axis center line,
wherein a distal part of each of the plurality of blades has a forward curved part,
a front end surface of a forward tip, of the forward curved part, has a lift type design in which a leading edge side of the front end surface is thicker than a trailing edge side of the front end surface,
at least a line, extending along the front end surface of each of the plurality of blades, extends orthogonal to the axis center line of the hub,
at the front end surface, of each of the plurality of blades, a trailing edge rather than a leading edge is inclined toward a direction of a curved outer surface, and
a maximum thickness of the front end surface of the forward tip of the forward curved part is set to be 50% of a thickness of a base end part of a base part.

* * * * *